US010445745B1

(12) United States Patent
Chopra et al.

(10) Patent No.: US 10,445,745 B1
(45) Date of Patent: Oct. 15, 2019

(54) COMPUTER SYSTEMS AND METHODS FOR EFFICIENT QUERY RESOLUTION BY CUSTOMER REPRESENTATIVES

(71) Applicant: FMR LLC, Boston, MA (US)

(72) Inventors: Ankush Chopra, Bengaluru (IN); Abhishek Desai, Bengaluru (IN); Aravind Chandramouli, Bengaluru (IN)

(73) Assignee: FMR LLC, Boston, MA (US)

( * ) Notice: Subject to any disclaimer, the term of this patent is extended or adjusted under 35 U.S.C. 154(b) by 0 days.

(21) Appl. No.: 16/365,309

(22) Filed: Mar. 26, 2019

(51) Int. Cl.
*G06Q 30/00* (2012.01)
*G06F 16/33* (2019.01)
*G06F 16/35* (2019.01)
*G06F 16/332* (2019.01)
*G06F 16/31* (2019.01)

(52) U.S. Cl.
CPC ........ *G06Q 30/016* (2013.01); *G06F 16/31* (2019.01); *G06F 16/3329* (2019.01); *G06F 16/3344* (2019.01); *G06F 16/353* (2019.01)

(58) Field of Classification Search
CPC ... G10L 15/22; G06F 16/353; G06F 16/3329; G06F 16/3344; G06F 16/31
USPC .............................................. 704/270, 270.1
See application file for complete search history.

(56) References Cited

U.S. PATENT DOCUMENTS

| | | | |
|---|---|---|---|
| 6,925,432 B2* | 8/2005 | Lee ..................... | G06K 9/6217 704/5 |
| 7,555,431 B2* | 6/2009 | Bennett .................. | G06F 17/27 704/255 |
| 7,831,426 B2* | 11/2010 | Bennett .................. | G06F 17/27 704/252 |
| 9,661,067 B2 | 5/2017 | Seth et al. | |
| 2005/0105712 A1* | 5/2005 | Williams .............. | G10L 13/027 379/265.02 |

(Continued)

OTHER PUBLICATIONS

Arra, Dan, "How to Personalize Customer Journeys with Predictive Analytics," Target Marketing, https://www.targetmarketingmag.com/article/how-personalize-customer-journeys-with-predictive-analytics/all/, May 22, 2015.

*Primary Examiner* — Jakieda R Jackson
(74) *Attorney, Agent, or Firm* — Proskauer Rose LLP

(57) ABSTRACT

A computerized method of representing customer interactions with an organization includes: receiving, by a computing device, customer web interaction data segments and customer conversation data segments; pre-processing the customer conversation data segments to remove specified types of information; scoring each of the pre-processed customer conversation data segments; pre-processing the customer web data interaction segments; extracting from the pre-processed customer web interaction data segments tokens; combining the pre-processed customer conversation data segments and the pre-processed customer web interaction data segments into a customer data set; parsing the customer data set into one or more windows; assigning, for each window, pre-trained weights to each of the tokens in each window; assigning a transaction theme to each window based on the tokens in each window; and generating, based on the transaction themes, a ranked list of topic keywords reflecting the customer web interaction data segments and customer conversation data segments.

15 Claims, 9 Drawing Sheets

(56) References Cited

U.S. PATENT DOCUMENTS

| | | | |
|---|---|---|---|
| 2014/0140497 A1* | 5/2014 | Ripa | H04M 3/5133 |
| | | | 379/265.06 |
| 2014/0250145 A1* | 9/2014 | Jones | G06Q 10/101 |
| | | | 707/769 |
| 2014/0297268 A1 | 10/2014 | Govrin et al. | |
| 2014/0314225 A1 | 10/2014 | Riahi et al. | |
| 2015/0296026 A1 | 10/2015 | Smyth et al. | |
| 2016/0071126 A1 | 3/2016 | Chang et al. | |
| 2017/0149969 A1* | 5/2017 | Mockus | H04M 3/5183 |
| 2017/0169325 A1* | 6/2017 | McCord | G06N 3/006 |
| 2017/0214799 A1* | 7/2017 | Perez | H04M 3/5235 |
| 2017/0346948 A1* | 11/2017 | Wolf | H04M 3/5166 |
| 2018/0338041 A1* | 11/2018 | McGann | G06N 7/005 |
| 2018/0359132 A1* | 12/2018 | Salameh | G06F 3/0481 |
| 2019/0057079 A1* | 2/2019 | Raanani | G06F 17/279 |

\* cited by examiner

COMPUTER SYSTEMS AND METHODS FOR EFFICIENT QUERY RESOLUTION BY CUSTOMER REPRESENTATIVES

TECHNICAL FIELD

This application relates generally to systems, methods and apparatuses, including computer programs, for helping customer representatives resolve customer queries. More specifically, this application relates to providing improved computer tools that permit customer representatives to address customer queries in an efficient and personalized manner.

BACKGROUND

Large organizations often employ customer representatives to assist customers with a variety of matters, such as answering customer queries and resolving technical support issues. Today, customer representatives can interact with customers via a number of channels, for example live discussions over the phone or live chat dialogues over the internet. To ensure customer satisfaction and retention, it is important to provide customer representatives with sufficient tools to answer customer queries efficiently and effectively.

Typically, when an organization receives a phone call from a customer requesting assistance, a customer representative is provided with a static customer profile having some background information on the customer and context for the call. The customer profile may include information such as name, age, and a summary of any accounts held. A more advanced system may also include a summary of the last time the customer called, together with the previous customer representative's notes on the reason for the call. However, such systems do not take into account the multiple channels through which customers interact with organizations, and they are dependent on past customer representatives taking effective notes.

Additionally, current search tools to aid customer representatives in answering customer queries can be imprecise and cumbersome to use. For example, when a customer representative does not know the answer to a customer's question, the typical solution is to use a search engine that provides a list of pages of possible customer questions with links to stock answers. In this scenario, the customer representative needs to review the question and answer pages in detail to determine the best match to the customer's question and the answer to the question. This setup can result in increased wait time for the customer and increased difficulty for the customer representative. This setup may result not only in poor customer satisfaction but also higher early attrition of customer representatives.

SUMMARY

Accordingly, the invention provides a novel framework, including a computing system and associated computing methods and modules, for helping customer representatives resolve customer queries more quickly and in a more personalized manner, resulting in higher customer satisfaction and improved operational efficiency. The systems and methods described herein can be implemented in many settings (e.g., call centers, virtual assistants, customer chat agents, customer call deflection using personalized IAM pop-ups, and even in proactive personalization of a customer journey) and in many industries, (e.g., e-commerce, banking, finance, and telecommunications).

In some embodiments, the invention provides a computing (e.g., AI-based) portal that provides one or more of the following: (a) a holistic summary of possible new customer interactions by analyzing the historical interactions using machine learning models; (b) automatic use of a customer's profile and/or interaction history to predict the customer's initial questions; (c) as the conversation continues, automatic use of the conversation context to predict one or more future customer questions; (d) automatic providing of the precise answers to these questions to the customer representative; and/or (e) automatic presentation of relevant pages to the customer service representative regarding the topic of conversation.

The invention can include two computing engines: (1) a context engine, which summarizes customer interactions, and (2) a query engine, which generates questions and mines answers to the questions. Each of these engines can be implemented in a server computing device that is in electronic communication with a customer representative terminal (e.g., a desktop or laptop computing device) and a series of databases (e.g., having historical chat data, phone call transcript data, and page name tags, all stored over one or more Hadoop cluster nodes).

The context engine can help overcome problems associated with traditional methods, which do not provide a comprehensive summary of a customer's activity and interactions with an organization across all possible interaction channels (and are often focused mostly or wholly on call history). These prior approaches limit the context available to demonstrate the customer's interactions with the organization, both in terms of the content and the recentness of those interactions.

The invention uses an algorithm to assign relative weights to webpage tokens associated with customer interactions, e.g., by comparing clicks in the customer's recent past to identify important webpages. The invention also includes a method developed specifically to summarize web interactions happening across different web mediums. The invention also includes a novel way of dividing customer interactions happening over time into shorter windows and assigning supervised and unsupervised summaries to such windows. The invention also is able to handle more than one form of unstructured data. Different analytical frameworks are used for processing data from different interaction channels, which work independently and ultimately are summarized to tell a coherent story of one user's set of interactions with an organization.

There are a number of reasons that customer interaction summarization cannot be done manually. First, customer interaction data often contains sensitive and private information about the customer, and so there can be significant concerns about giving employees direct access to this information. Second, the sheer volume of available customer data for a large organization can be vast (e.g., billions of clicks and hundreds of thousands of calls and chat interactions), which makes manual processing either practically or actually impossible. Third, call and chat transcripts can be so large that manual identification of important excerpts and summarization is often not possible in a real-time query resolution scenario. Fourth, identification of important webpage tokens can involve reviewing billions of customer clicks periodically as new pages are added on an ongoing basis. Fifth, transcription accuracy of upstream systems is often not great, and a result, call transcripts are often incomprehensible.

With respect to the query engine, used for question generation and answer mining, current systems rely on the search phrases typed by the customer representatives. Such search phrases take the form of a topic or a set of keywords. In contrast, the present system converts a customer representative's typed search phrase to specific questions using different data sources (e.g., questions from chat and historical questions asked on the platform) and customer context (e.g., customer interaction summarization and customer demography). Representatives can choose any question or type one of their own. Thus, the invention provides a novel method for conversion of search phrases to questions.

In addition, in prior systems, answers are searched in a dataset of topics based on keywords, and the search results are webpages in which the keywords appear. Customer representatives then have to look through the webpages to identify the exact location of the answer related to the question asked by the customer. In contrast, the present system automates all of the above by identifying (1) the potential set of information the customer may be seeking, and (2) the exact passage and location of the required answer. Algorithms are employed to rank pages and retrieve answer passages by using context information from customer questions, demography and interaction history. The answer to a question may be retrieved from various data sources, e.g., chat VA archives, indexed websites, and/or indexed reference point data. Third, the present system presents to the customer representative a collection of follow-up questions that may be asked by customer—a capability absent from traditional systems.

There are also a number of reasons that question generation and answer mining cannot be done manually. First, the sheer volume of data available that might contain an answer makes manually looking for answers a tedious task. Second, even with traditional systems, which provide a list of potential pages, the task of filtering the pages and getting to the answer is a time consuming one that wastes time of both customers and customer representatives. Third, identifying candidate questions requires a human to look up a large list of questions manually. Once the potential candidate questions are identified, ranking them based on the customer profile and historical interactions is itself a time consuming effort, after defining a strategy for ranking.

In one aspect, the invention features a computerized method of representing customer interactions with an organization. The computerized method includes receiving, by a computing device, customer web interaction data segments and customer conversation data segments including at least one of chat data or phone call transcripts. The computerized method also includes pre-processing, by the computing device, the customer conversation data segments to remove specified types of information, thereby generating pre-processed customer conversation data segments, each data segment having a timestamp and a customer identifier. The computerized method also includes scoring, by the computing device, each of the pre-processed customer conversation data segments using a pre-trained transaction module. The computerized method also includes pre-processing, by the computing device, the customer web data interaction segments, thereby generating pre-processed customer web data interaction segments, each data segment having a timestamp and a customer identifier. The computerized method also includes extracting, by the computing device, from the pre-processed customer web interaction data segments, one or more tokens. The computerized method also includes combining, by the computing device, the pre-processed customer conversation data segments and the pre-processed customer web interaction data segments into a customer data set. The computerized method also includes parsing, by the computing device, the customer data set into one or more windows using the timestamps and the customer identifiers, each window including one or more tokens. The computerized method also includes assigning, by the computing device, for each window, pre-trained weights to each of the one or more tokens in each window. The computerized method also includes assigning, by the computing device, a transaction theme to each window based on the on one or more tokens in each window using an association model. The computerized method also includes generating, by the computing device, based on the transaction themes, a ranked list of topic keywords reflecting the customer web interaction data segments and customer conversation data segments.

In some embodiments, the method includes displaying, by the computing device, the ranked list of topic keywords in a user interface for a customer service representative. In some embodiments, the method includes storing, by the computing device, the ranked list of topic keywords in a database in electronic communication with the computing device. In some embodiments, pre-processing the customer conversation data segments removes system metadata. In some embodiments, extracting the one or more keywords from the pre-processed customer conversation data segments includes: (i) combining, by the computing device, customer interaction data from a single data session into one text file; (ii) applying, by the computing device, a sentence tokenization algorithm to parse the customer interaction data session into discrete sentence tokens; and (iii) identifying, by the computing device, key phrases using a stop phrase algorithm to identify, within the discrete sentence tokens, one or more phrases having specified characteristics. In some embodiments, the method includes scoring each of the pre-processed customer interaction data segments includes: (i) tokenizing, by the computing device, each of the one or more pre-processed customer interaction data segments; (ii) converting, by the computing device, for each of the one or more pre-processed customer interaction data segments, the tokenized data into a feature-document matrix; (iii) calculating, by the computing device, a score for each pre-processed customer interaction data segment; (iv) determining, by the computing device, a highest score; and (v) assigning, by the computing device, a pre-processed customer interaction data segment having the highest score to the customer conversation data segment, provided that the highest score is above a certain threshold.

In some embodiments, combining the pre-processed customer interaction data segments into a single customer data set includes rolling up the one or more pre-processed customer data segments using customer identifiers and timestamps, thereby creating a chronologically sorted representation of customer interactions for each customer. In some embodiments, pre-processing the customer web data interaction segments includes at least one of cleaning html encodings from page name tags, adding URL identifiers, or removing channel information. In some embodiments, the one or more tokens extracted from the pre-processed customer web interaction data segments are at least one of unigram tokens or bigram tokens. In some embodiments, a new window is created if a customer medium of interaction changes in time or a period of more than a pre-determined time threshold passes with no customer activity occurring. In some embodiments, assigning pre-trained weights to each of the one or more tokens in each window includes calculating an inverse document frequency (IDF) value for all tokens. In some embodiments, assigning a transaction theme to each window is based on selecting a top three tokens for each web window. In some embodiments, generating the ranked list of topic keywords includes applying a formula using context keywords, channel weights, and interaction times as decay weights to score the topic keywords for each customer.

In another aspect, the invention features a computerized method of developing an index of questions, answers, and follow-up questions. The computerized method includes receiving, by a computing device, a corpus of question phrases and answer phrases based on records of prior customer interactions. The computerized method also includes pre-processing, by the computing device, the question phrases to remove extraneous information, thereby generating pre-processed question phrases. The computerized method also includes extracting, by the computing device, at least one keyword from the pre-processed question phrases. The computerized method also includes indexing, by the computing device, the pre-processed question phrases in a question-answer database having fields for questions and corresponding answers. The computerized method also includes receiving, by the computing device, customer message data from one or more data sources. The computerized method also includes extracting, by the computing device, a set of customer questions asked by a customer during a computing session. The computerized method also includes determining, by the computing device, a score for each question in the question-answer database based on a likelihood of becoming a follow-up question by the customer. The computerized method also includes ranking, by the computing device, the possible follow up questions by score. The computerized method also includes indexing, by the computing device, the questions and follow up questions in a database stored in memory in electronic communication with the computing device.

In some embodiments, pre-processing the question search phrases includes removing at least one of punctuation, conjunctions, pause words, question signifiers, or noise words. In some embodiments, the at least one key word or phrase extracted is a noun phrase, unigram noun or unigram verb. In some embodiments, indexing further includes (i) extracting, by the computing device, key words or phrases ordered according to sequence of occurrence in the question; (ii) extracting, by the computing device, question words from the question; (iii) tokenizing, by the computing device, the extracted key words or phrases, question words and questions at word boundaries; (iv) storing, by the computing device, each type (noun phrases, unigram noun, unigram verbs, verb phrases) question word and the question in a separate fields of a record of a reverse index; and storing, by the computing device, the answer to the question in another field of record. In some embodiments, the method further includes determining one or more predictions of follow-up questions by the customer by (i) identifying, by the computing device, questions from sentences uttered by the customer using a question detection classifier, (ii) determining, by the computing device, a presence of one or more question keywords, (iii) grouping, by the computing device, questions associated with the question keywords, and (iv) identifying, by the computing device, using a sliding window algorithm and a frequent item set algorithms, possible follow up questions for a given question. In some embodiments, determining the scores includes calculating linear combinations of features including at least one of noun phrases, verb phrases, and unigrams, the features weighted to arrive at a score.

In another aspect, the invention features a computerized method of retrieving (i) answers to questions and (ii) follow up questions, for use by a customer service representative. The computerized method includes receiving, by a computing device, a question search phrase inputted by a customer service representative. The computerized method also includes pre-processing, by the computing device, the question search phrase to remove extraneous information, thereby generating a pre-processed question or search phrase. The computerized method also includes extracting, by the computing device, at least one key word or phrase from the question search phrase. The computerized method also includes retrieving, by the computing device, an answer corresponding to the question search phrase, the answer located in an answer field of a question-answer index. The computerized method also includes retrieving, by the computing device, if no answer exists in the answer field of the question-answer index, from one or more documents corresponding to the question search phrase, relevant text passages. The computerized method also includes scoring, by the computing device, the relevant text passages based on a frequency of query keywords appearing in the relevant text passages. The computerized method also includes designating, by the computing device, the text passage having the highest score as the answer. The computerized method also includes retrieving, by the computing device, one or more predictions of follow-up questions for a given question.

In some embodiments, the method includes displaying, by a computing device, the predictions of follow-up questions and the set of ranked answers for the customer representative. In some embodiments, the method includes a feedback loop to iteratively better define the follow-up questions that are returned, the feedback loop adjusting the weights of follow-up questions based on feedback received. In some embodiments, pre-processing the question search phrase includes removing at least one of punctuation, conjunctions, pause words, question signifiers, or noise words. In some embodiments, the at least one key word or phrase extracted is a noun phrase, unigram noun or unigram verb. In some embodiments, retrieving an answer from the answer field includes (i) matching the question search phrase with the corresponding indexed question for an approximate match based on n-gram, (ii) skipping n-gram matching, and (iii) selecting the question that has the highest score. In some embodiments, retrieving relevant text passages includes comparing an incoming query against phrase match in document title, document body, topic hierarchy, document content, and context features to match in topic hierarchy or title. In some embodiments, scoring the relevant text passages based on a frequency of query keywords appearing in the relevant passage includes a sliding window algorithm. In some embodiments, retrieving the predictions of follow up questions for a given question from the customer representative is performed using a matching algorithm that includes matching the question search phrase with the corresponding indexed question for an approximate match based on n-gram, skip n-gram matching and selecting the question that has the highest score.

In another aspect, the invention features a computerized system including a computing device including a context engine for representing customer interactions with an organization and a query engine for generating a question-answer set for use by a customer service representative of an organization and mining answers to questions, the computing device configured to: receive customer web interaction data segments and customer conversation data segments including at least one of chat data or phone call transcripts; pre-process the customer conversation data segments to remove specified types of information, thereby generating pre-processed customer conversation data segments, each data segment having a timestamp and a customer identifier; score each of the pre-processed customer conversation data segments using a pre-trained transaction module; pre-process the customer web data interaction segments, thereby generating pre-processed customer web data interaction segments, each data segment having a timestamp and a customer identifier; extract, from the pre-processed customer web interaction data segments, one or more tokens; combine the pre-processed customer conversation data segments and the pre-processed customer web interaction data segments into a customer data set; parse the customer data set into one or more windows using the timestamps and the customer identifiers, each window including one or more tokens; assign, for each window, pre-trained weights to each of the one or more tokens in each window; assign a transaction theme to each window based on the on one or more tokens in each window using an association model; and generate, based on the transaction themes, a ranked list of topic keywords reflecting the customer web interaction data segments and customer conversation data segments; one or more databases in electronic communication with the computing device, the one or more databases storing customer web interaction data and customer conversation data including at least one of chat data or phone call transcripts; and a virtual agent computing device in electronic communication with the computing device.

In some embodiments, the system further includes a chat VA archives database in electronic communication with the computing device; a historical questions database in electronic communication with the computing device; a search questions database in electronic communication with the computing device; a customer demography database in electronic communication with the computing device; and a user feedback store database in electronic communication with the computing device.

BRIEF DESCRIPTION OF THE DRAWINGS

The advantages of the invention described above, together with further advantages, may be better understood by referring to the following description taken in conjunction with the accompanying drawings. The drawings are not necessarily to scale; emphasis is instead generally placed upon illustrating the principles of the invention.

DETAILED DESCRIPTION

Figure 1:
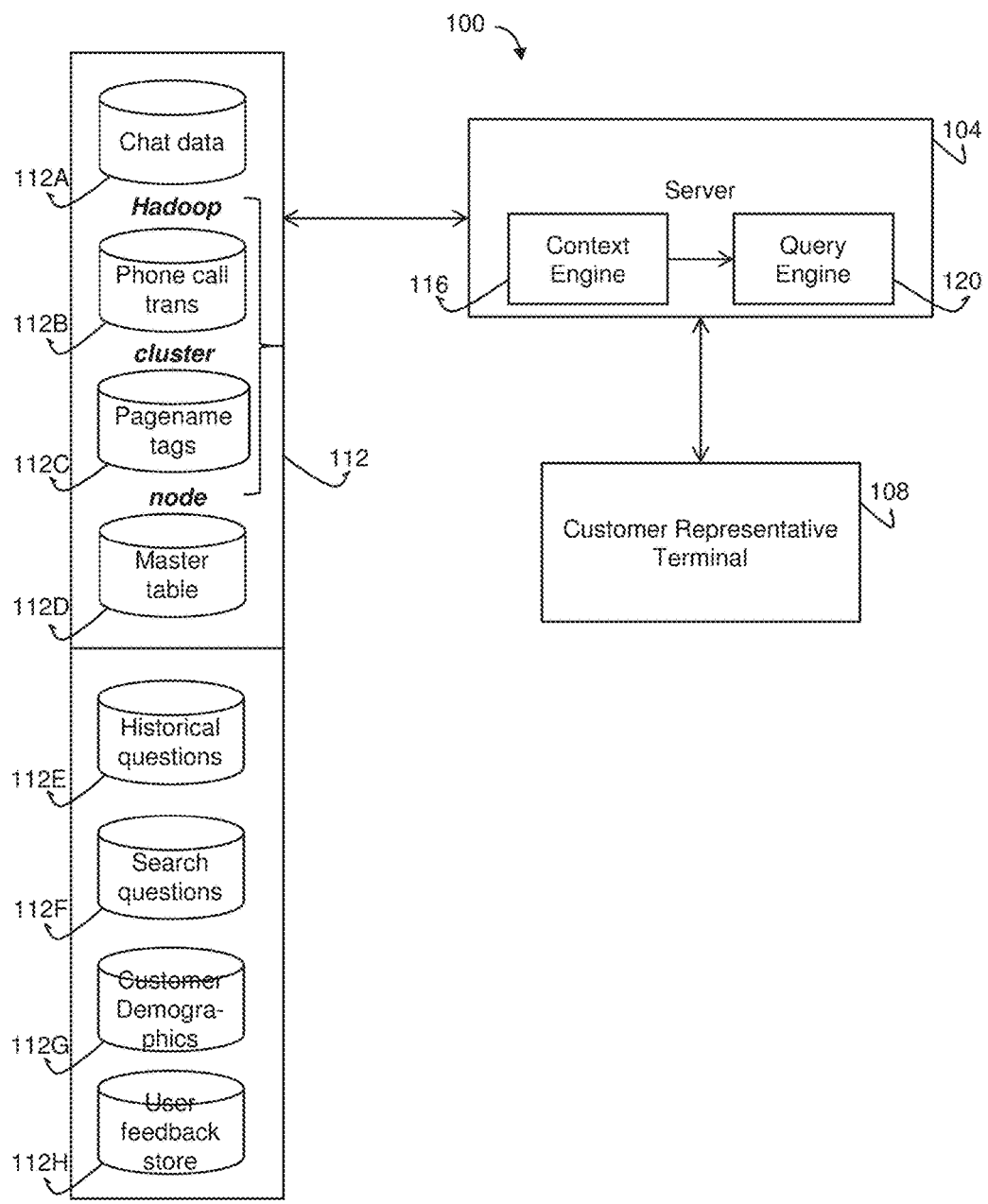
FIG. 1 is a schematic diagram of a computing system for aiding a customer representative in resolving customer queries, according to an illustrative embodiment of the invention.

FIG. 1 is a schematic diagram of a computing system 100 for aiding a customer representative in resolving customer queries, according to an illustrative embodiment of the invention. The computing system 100 includes a server computing device 104, a customer representative terminal computing device 108 in electronic communication with the server computing device 104, and a database system 112 in electronic communication with the server computing device 104. The server computing device 104 includes a context engine 116 for summarizing a customer's activity across multiple interaction channels of an organization (e.g., phone, web chat, etc.), and a query engine 120 for searching phrases to generate questions and mine answers to the questions. The customer representative terminal computing device 108 can be a variety of computing devices, such as any personal or business computer that is known in the art. The database 112 can be implemented in a Hadoop cluster node having one or more databases 112A-112H for storing chat data, phone call transcripts, page name tags or other web data, historical questions, search questions, customer demographic information, user feedback, and a master table of new information generated in accordance with the invention. Specific methods and modules implemented on the system 100 are described in greater detail below.

Figure 2:
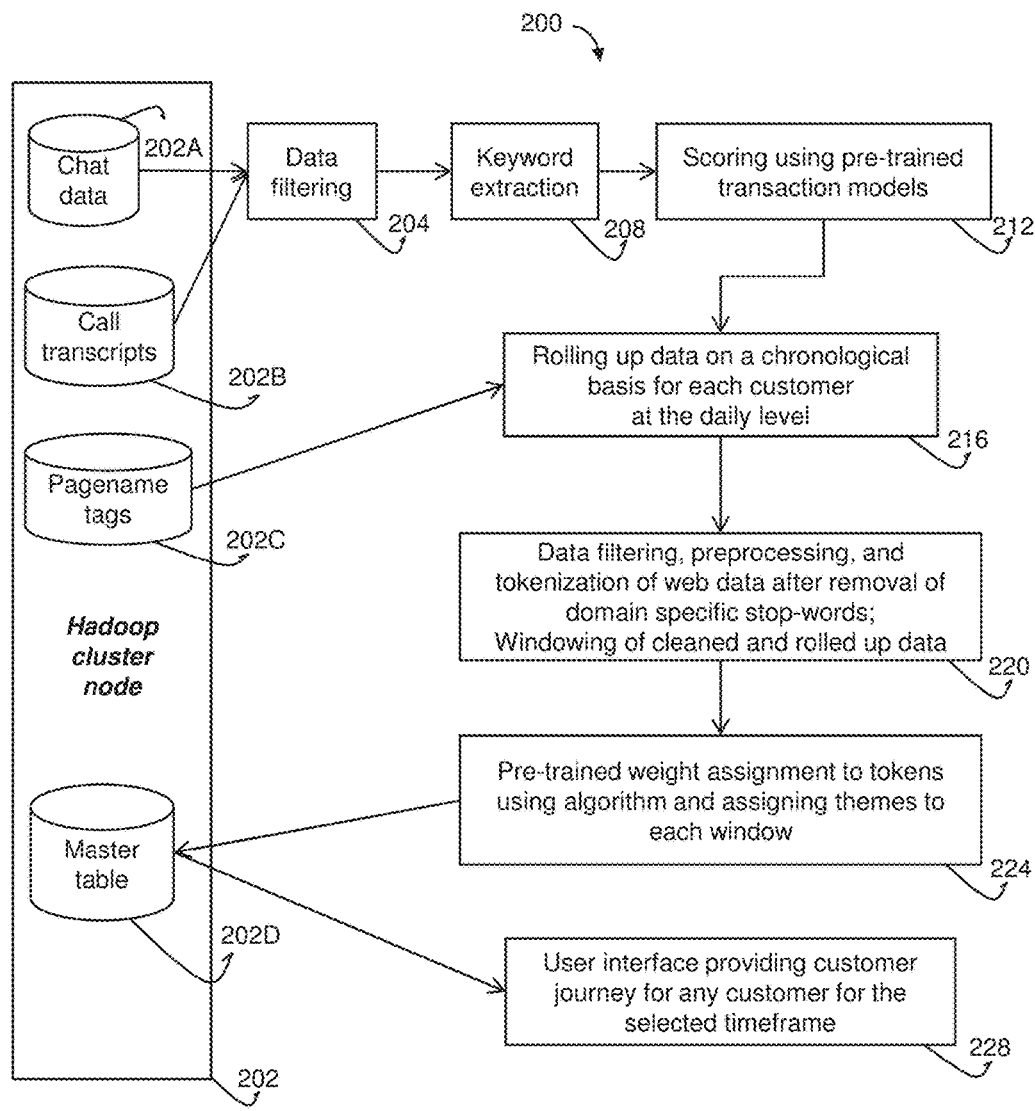
FIG. 2 is a flow diagram of a computerized method for summarizing a customer's activity across multiple interaction channels with an organization, according to an illustrative embodiment of the invention.

FIG. 2 is a flow diagram 200 of a computerized method for summarizing a customer's activity across multiple interaction channels with an organization, according to an illustrative embodiment of the invention. The steps can be performed by the context engine 116 of the server computing device 104 shown and described in FIG. 1. The method provides a unified context showing what interests a particular customer as reflected by his or her interactions with the organization. This summary can provide valuable input to customer representatives, which can enable them to help customers faster and more efficiently.

In a first step 204, raw data is received by the computing device from one or more databases (e.g., the databases 202A, 202B, 202C stored over the Hadoop cluster node 202). The data can include chat data 202A (e.g., transcripts of chat sessions between customer representatives and customers) and/or phone call transcripts 202B (e.g., transcriptions of voice calls between customer representatives and customers). The data can also include pagename tags 202C, e.g., web interactions that summarize a customer's interactions with the organization's website. Some or all of this data can be used to create a timeline of the customer's journey with the organization and to identify the context for future customer inquiries. All of these datasets can be recorded and archived. During recording, system metadata can be stored as well as conversation data. For example, chat and call datasets also include certain system messages, e.g., "party has left the session" and accompanying web data, e.g., "metrics.fidelity.com". However, for the task at hand, such system messages can be identified and filtered by deeming them as noise.

In a second step 208, after filtering the system messages and other noise, keywords from call and chat data are extracted. In one exemplary keyword extraction process, the following sub-steps are performed. First, all messages in the same conversation are combined into one text file. Second, multiple whitespaces are collapsed into one. Third, customer-related masked information from the text is replaced (e.g., [name], [number redacted], [junk], [laughter] etc.). Fourth, sentence tokenization is applied to break the whole conversation into sentences. Fifth, key phrases are identified using an algorithm that extracts sub-strings between two stop words. Stop words for this exercise can contain both typical English stop words and domain specific stop words. A domain specific stop word list can be generated by analyzing large volumes of past chat and call transcript data.

In a third step 212, a score can be generated for each of the pre-processed customer conversation data segments using a pre-trained transaction model. Certain defined transactions (e.g., customer issue swim lanes), and most of the incoming calls can be categorized into one of several pre-defined categories. Chat and call transcripts can be scored to assign one of these pre-defined transactions to the interactions. In one exemplary embodiment, the steps involved in scoring are as follows. First, the cleaned version of the text is taken from the previous module. Second, the text data from list of all the text features present in transaction models is tokenized and converted into a feature-document matrix. Transaction models can be built on ground truth data (e.g., after being manually tagged by a team of customer representatives after listening to the customer calls). These transaction models can be logistic regression-based classification models and can be built using a "one-vs.-rest" method. Because of the one-vs.-rest modeling scheme, all the conversations are scored for all the transaction models. Third, the transaction with the highest prediction probability is assigned to the conversation, provided also that it is above a certain threshold (if it is not above the threshold, no assignment is made).

In a fourth step 216, data is sorted, rolled up and merged from all customer interaction channels. After the scoring of call transcript and chat, data from these datasets is merged with web interaction data. The merged data set is sorted at the customer and timestamp level. The sorted data is then rolled up at the customer and date level to create a customer timeline view (e.g., in chronological order).

Figure 3:
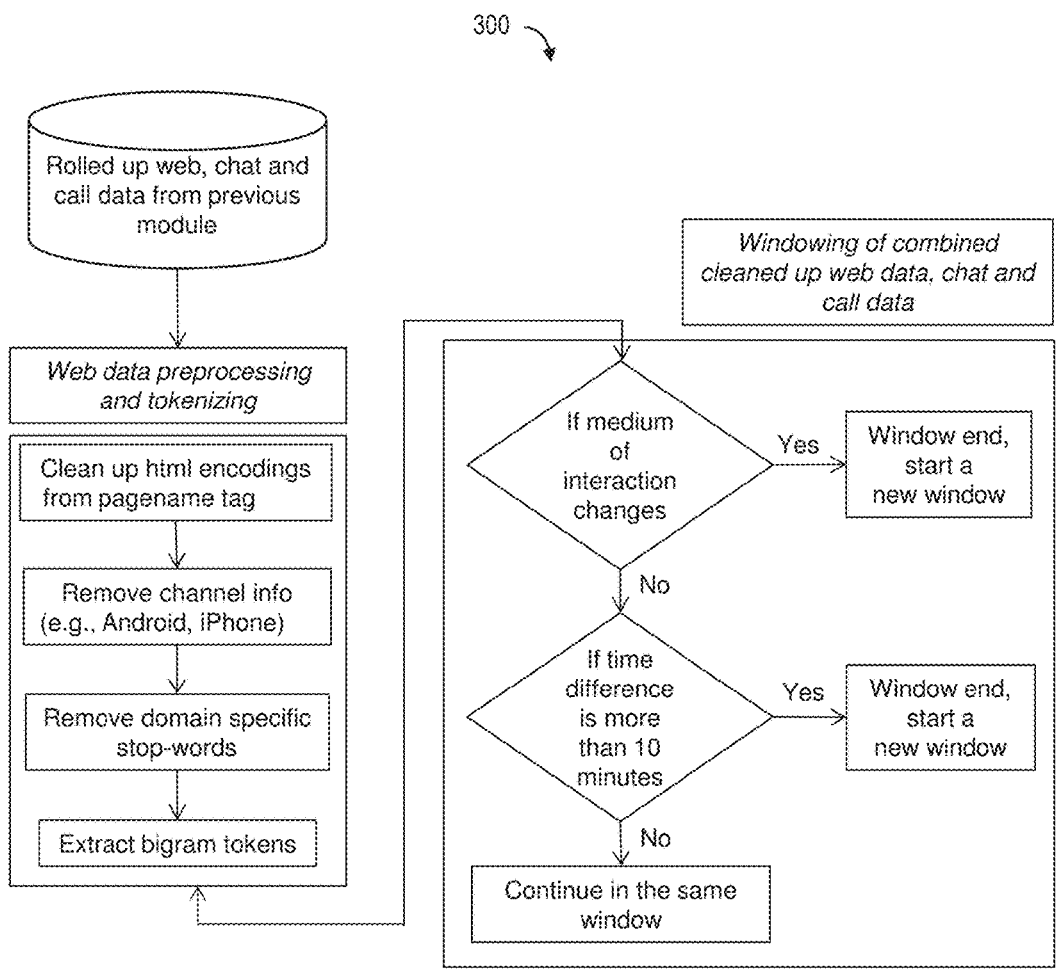
FIG. 3 is a flow diagram of a computerized method for processing web data, tokenizing, and windowing, according to an illustrative embodiment of the invention.

In a fifth step 220, the web data is preprocessed and tokenized, and windowing is performed. Each of these separate processes can be seen in more detail in the flow diagram 300 shown in FIG. 3. In one exemplary embodiment, the following steps are involved in preprocessing and tokenizing of the web data:

| (A) Assemble web interaction data (clickstream data), e.g.: | | | |
|---|---|---|---|
| Ip | click_timestamp | pagename_tag | click_Date |
| → 526460 | 4/1/17 9:17:31 | fid.com%20web%7clogin%7cerrorpages%7cincorrect%20username%20or%20password | 04/01/2017 |
| 526460 | 4/1/17 9:18:55 | fid.com%20web%7clogin%7clogin%20page | 04/01/2017 |
| 526460 | 4/1/17 9:19:13 | android%20web%7clogin%7clogin%20page | 04/01/2017 |
| 109098 | 4/1/17 12:23:02 | fid.com%20web%7cportfolio%7ctax%7ctax%20information | 04/01/2017 |
| 109098 | 4/1/17 12:24:15 | iphone%20web%7clogin%7clogin%20page | 04/01/2017 |

| (B) Clean up html encodings from page name tag (e.g., URLs identifiers), e.g.: | | | |
|---|---|---|---|
| ip | click_timestamp | pagename_tag | click_Date |
| 526460 | 4/1/17 9:17:31 | fid.com web\|login\|errorpages\|incorrect username or password | 04/01/2017 |
| 526460 | 4/1/17 9:18:55 | fid.com web\|login\|login page | 04/01/2017 |
| 526460 | 4/1/17 9:19:13 | android web\|login\|login page | 04/01/2017 |
| 109098 | 4/1/17 12:23:02 | fid.com web\|portfolio\|tax\|tax information | 04/01/2017 |
| 109098 | 4/1/17 12:24:15 | iphone web\|login\|login page | 04/01/2017 |

| (C) Remove channel info (e.g., Android/iPhone identifiers, symbols and stop-words), e.g.: | | | |
|---|---|---|---|
| ip | click_timestamp | pagename_tag | click_Date |
| 526460 | 4/1/17 9:17:31 | login errorpages incorrect username or password | 04/01/2017 |
| 526460 | 4/1/17 9:18:55 | login login page | 04/01/2017 |
| 526460 | 4/1/17 9:19:13 | login login page | 04/01/2017 |
| 109098 | 4/1/17 12:23:02 | portfolio tax tax information | 04/01/2017 |
| 109098 | 4/1/17 12:24:15 | login login page | 04/01/2017 |

| (D) Extract bigram tokens, e.g.: | | | |
|---|---|---|---|
| ip | click_timestamp | Bigram tokens | click_Date |
| 526460 | 4/1/17 9:17:31 | 'login errorpages', 'errorpages incorrect', 'incorrect username', 'username password' | 04/01/2017 |
| 526460 | 4/1/17 9:18:55 | 'login login', 'login page' | 04/01/2017 |
| 526460 | 4/1/17 9:19:13 | 'login login', 'login page' | 04/01/2017 |
| 109098 | 4/1/17 12:23:02 | 'portfolio tax', 'tax tax', 'tax information' | 04/01/2017 |
| 109098 | 4/1/17 12:24:15 | 'login login', 'login page' | 04/01/2017 |

| (E) Window combined cleaned up web data, chat and call data; roll up the data at ip and date level; e.g.: | | | |
|---|---|---|---|
| ip | date | timestamps | tokens |
| 526460 | 04/01/2017 | 04/01/2017 9:17:31, 04/01/2017 9:18:55, 04/01/2017 9:19:13 | 'login errorpages', 'errorpages incorrect', 'incorrect username', 'username password', 'login login', 'login page' |
| 109098 | 04/01/2017 | 04/01/2017 12:24:15, 04/01/2017 12:25:02 | 'portfolio tax', 'tax tax', 'tax information', 'login login', 'login page' |

-continued (F) Take daily rolled-up data and perform windowing of customer activities. There are two conditions for windowing.
(1) Medium of interaction changes.

| IP | date | timestamp | content |
|---|---|---|---|
| lp1 | D1 | T1, T2, T3, T4, T5 | Chat1, Call1, Web1, Web2, Chat2 |
| lp1 | D2 | T1, T2, T3, T4 | Call1, Web1, Chat1, Call2 |

→

| IP | date | Timestamp_window | content |
|---|---|---|---|
| lp1 | D1 | [T1], [T2], [T3, T4], [T5] | [Chat1], [Call1], [Web1, Web2], [Chat2] |
| lp1 | D2 | [T1], [T2], [T3], [T4] | [Call1], [Web1], [Chat1], [Call2] |

If medium remains the same, but there is a significant gap between two activities. In some embodiments, 10 minutes is taken as a threshold for calling a gap significant. This condition predominantly helps in windowing the web activities.

| IP | date | timestamp | content |
|---|---|---|---|
| lp1 | Di | T1, T + 3, T + 4, T + 5, T + 14, T + 40, T + 43, T + 45, T + 47 | Call1, Web1, Web2, Web3, Web4, Web5, Web6, Call2, Web7 |

→

| IP | date | Timestamp_window | content |
|---|---|---|---|
| lp1 | Di | [T1], [T + 3, T + 4, T + 5, T + 14], [T + 40, T + 43], [T + 45], [T + 47] | [Call1], [Web1, Web2, Web3, Web4], [Web5, Web6], [Call2], [Web7] |

*ip = unique customer identifier; ** = page name tag.

Figure 4:
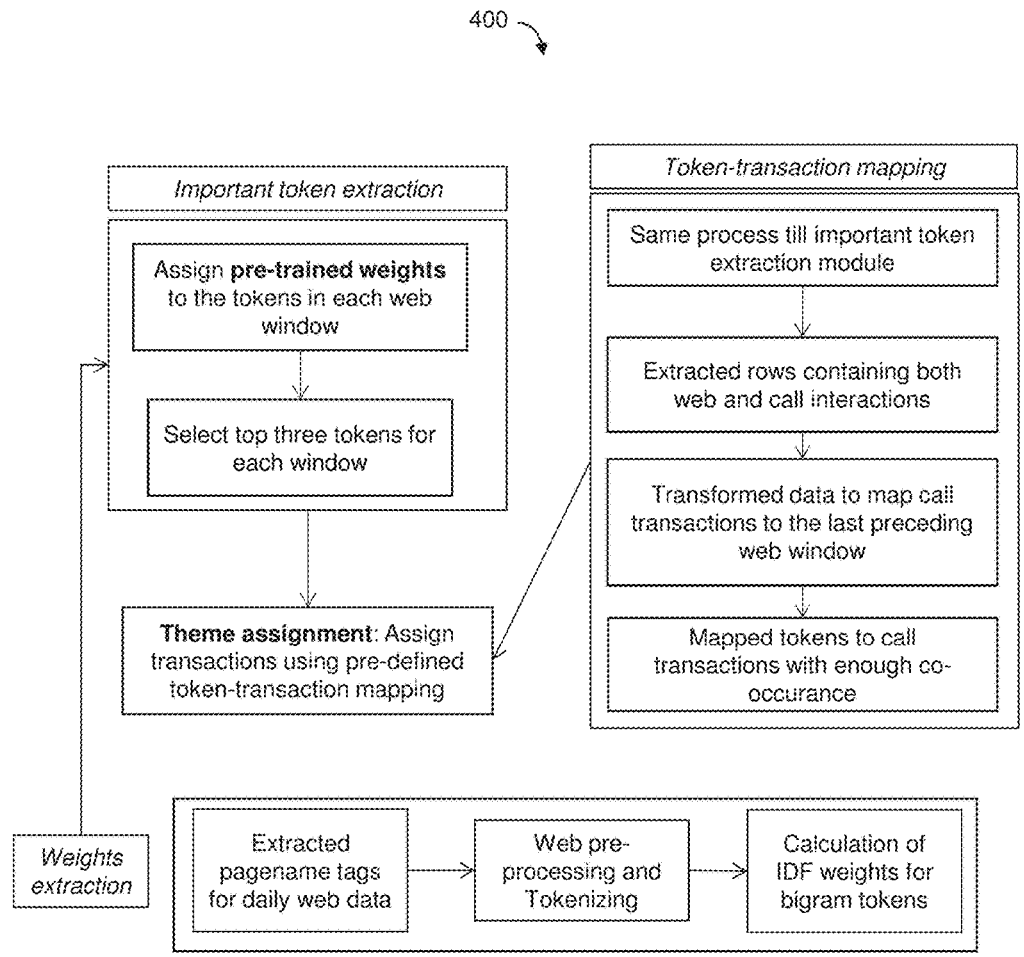
FIG. 4 is a flow diagram of a computerized method for important token extraction and theme assignment, according to an illustrative embodiment of the invention.

In a sixth step 224, important token extraction is performed and theme assignment for web data is conducted. The details of each of these steps can be seen in the flow diagram 400 shown in FIG. 4. For important token extraction, after the windowing operation of the previous module, all the windows of web interactions are taken, and the top three bigrams are chosen to represent the customer activity in the window. Pre-trained weights can be used to assign bigram importance. One exemplary process of weight assignment training for bigram tokens is as follows. First, take historical web data for all the customers for a defined time window (at least three months). Second, filter the web-data as described above in step 204. Third, create bigram tokens as described above. Fourth, calculate inverse document frequency (IDF) values for all the tokens and create a dictionary that stores the bigrams and their IDF values (as importance).

For theme assignment, once the top three bigrams are selected for a web window, a theme or transaction is assigned to the bigrams based on a bigram-to-transaction association model. One exemplary model training process is as follows. First, assemble historical call transcript and web data for several months (e.g., a representative sample for the population). Second, perform the appropriate cleaning, filtering to the datasets (e.g., as in steps 204 and 208 above). Third, score the call transcript data using transaction models (e.g., as in step 212). Fourth, merge the scored call transcript data with web data (e.g., as in step 216). Fifth, generate bigrams to represent the web data and sort the merged data set at customer and activity timestamp level and create customer activity windows. Sixth, take all the call windows and preceding web windows together and measure the association of the bigrams with the transactions tagged for the calls. Seventh, apply a threshold and take the bigram-transaction pairs with strong associations to create a bigram-to-transaction association model.

In a seventh step 228, context features are generated. In some embodiments, the following are used as context features: (1) context keywords (topic bigrams, unigrams); (2) Channel as channel_weight; (3) Interactions time (as a decay weight). These context features can be combined according to the formula:

$$\text{Topic } N\text{Gram} = \text{Average}(\text{channel\_weight} * t\_\text{decay}),$$

where $t\_\text{decay} = 10 * e^{(-lt)} + 1$; $t$=(current time−interaction time) in hours; and $l$=0.08 (a value between 0 and 1). For example:

| Customer | Topic Keywords | Channel | Channel Weight | Interaction Time | Current time |
|---|---|---|---|---|---|
| A | Password_Reset | Web | 0.5 | Aug. 20, 2017: 10 PM | Aug. 21, 2017: 10 PM |
| A | IRA; Retirement | Phone | 0.2 | Aug. 19, 2017: 10 PM | Aug. 21, 2017: 10 PM |
| A | Retirement | Web | 0.5 | Aug. 18, 2017: 10 PM | Aug. 21, 2017: 10 PM |

Using the formula given above, the topic keywords for each customer are scored. For example:

| Topic Keywords | Score |
|---|---|
| Password_Reset | 1.966069621 |
| IRA | 0.414936013 |
| Retirement | 0.946447129 |

Then, the final output is a ranked list of topic keywords. For example:

| Customer | Ranked Topic Keywords |
|---|---|
| A | Password_Reset; Retirement; IRA |

In some embodiments, additional context features are provided in the form of "Cosmo whisper" (which refers to keywords uttered by customers when calling in for customer service) in a similar manner to the formula described above.

Figure 5:
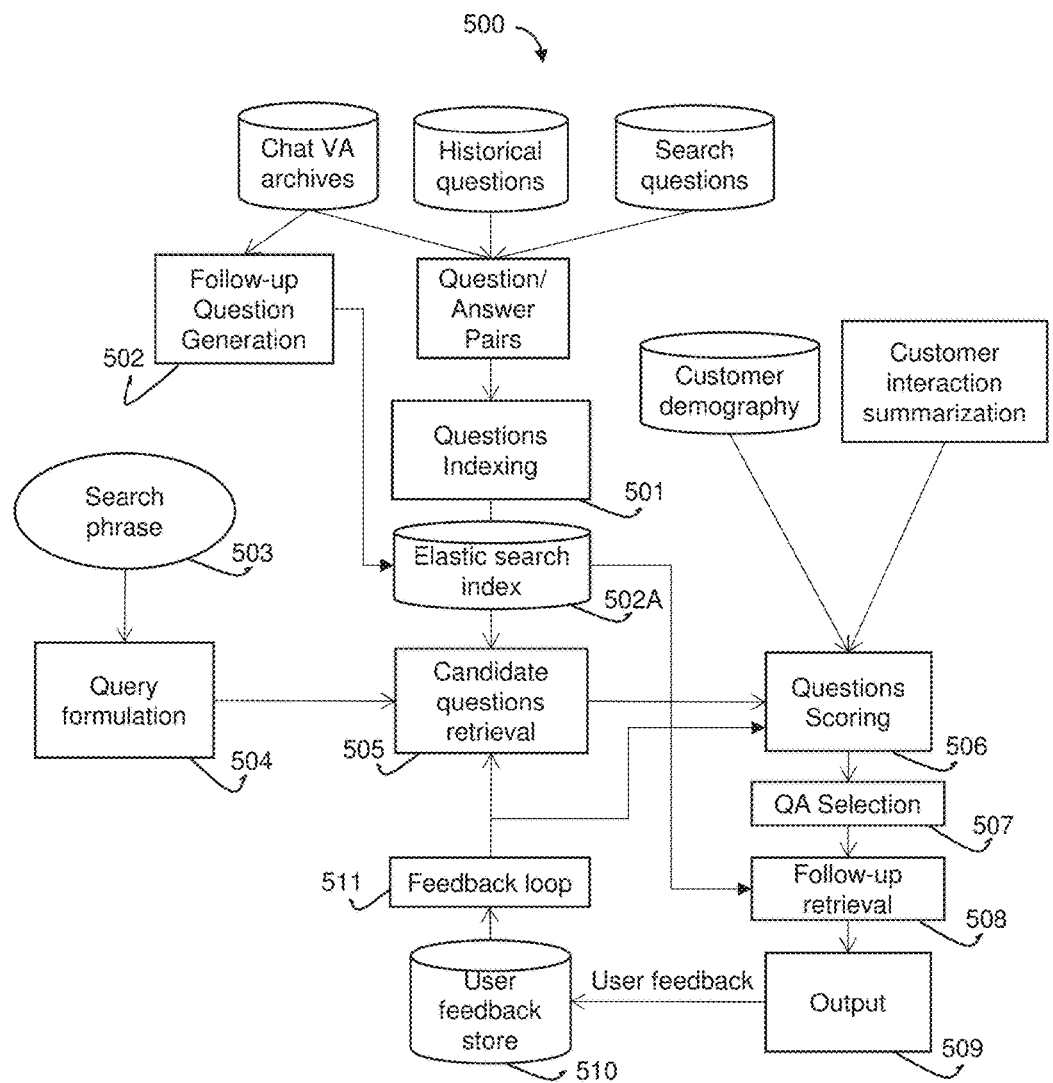
FIG. 5 is a flow diagram of a computerized method of using a question-answer module, according to an illustrative embodiment of the invention.

FIG. 5 is a flow diagram 500 of a computerized method of operating a question-answer module, according to an illustrative embodiment of the invention. These steps can be performed by the query engine 120 shown and described above in FIG. 1. In a first step 501, a question and answer index is created. Initially, questions are cleaned, e.g., by a process of punctuation removal from the beginning of a sentence; words such as "and", "ok", "also", "but" are removed; question words (e.g., what, how, can I) are identified; and noise before the question words is removed (e.g., segments not containing any context or important keywords). Then, features such as noun phrases, verb phrases and useful unigrams are extracted from the clean question and kept in separate fields. These features are maintained in the same order in which they appear in the clean question, and they comprise the set of important key phrases of the question. Separate fields for questions and answers are maintained, along with an identifier for the question-answer pair. A list of follow-up questions derived from the chat logs is also maintained in a separate field. The ordering of follow-up questions can be based on the frequency with which they occur.

In a second step 502, follow-up questions are generated. An algorithm can be used to automatically generate the follow-up questions from the chat sessions. For example, in a chat session, a customer usually asks a question or a set of questions for which the customer representative responds. Once the customer representative responds to these questions, the customer typically follows up with additional questions. Since these additional questions are in an unstructured format and are embedded within the other conversations that the customer has with the customer representative, specialized algorithms are needed to identify the questions and then to identify the most relevant follow-up question(s) for a certain question.

In one exemplary embodiment, such an algorithm can function as follows. Sentences that are attributed to the customer are first extracted, and then questions are identified using a Question Detection algorithm. The Question Detection algorithm can be a classifier that functions by using the sentence structure and the presence of question keywords (e.g., "wh" words like who/what/where/when/why, "can", or "is"). Once the questions are identified from the chat corpus, the questions are grouped together depending on their order of occurrence within the session. A sliding window of size 'n' is then used to identify the collection of questions that are co-located with each other. These co-located questions are then passed to a frequent item set-like algorithm to identify a question and the list of follow up questions. This algorithmically generated list of follow up questions is then stored in an elastic search index or store 502A along side the QA pair matching the question.

In a third set of steps represented by modules 503, 504, 505, 506, 507, candidate questions are retrieved and scored. For an incoming search phrase, a query is dynamically generated to search in the question-answer index using the following features: (i) a search phrase, to search in noun phrases and useful unigrams field; (ii) the search phrase, for an exact match in the questions field; (iii) the search phrase, for a "fuzzy" match in the question field with word order maintained; (iv) the context features combined with context feature weights to search the noun phrases, useful unigrams and answer fields. The above query output can be linearly combined with different weights given to each of the features to arrive at the final score for the results. The highest scoring question along with its answer is returned if it crosses a threshold value derived through data analysis. The feedback data can be used to adjust the weights for the features in the future based upon iterative refinement.

In a fourth step 508, follow up questions are retrieved. For the highest scoring question-answer pair from the third step, the corresponding follow-up questions list is retrieved from the index which was created in the second step, and output 509 is generated.

In a fifth step represented by modules 510, 511, a feedback loop is used. Incoming questions are mapped to the internal question-answer database to find the closest question match, and the question-answer pair is presented to the customer representative. If the question mapping is not correct, the customer representative can provide feedback indicating that a mismatch has occurred. If it is correctly mapped, the feedback can also indicate as much. In some embodiments, feedback data is collected for both question-to-question mapping and answer correctness. Question-to-question feedback data can be collected over time and can be used for the feedback loop. Each record can be represented by a 3-tuple (asked question, mapped question, feedback). As an example: What is meant by wash sale, What is a wash sale?, Y; can i convert from roth ira to traditional ira?, Can I contributed to both roth ira and traditional ira, N. Internally, an id can be maintained for the mapped questions, e.g., the tuple becomes: (incoming question, mapped question id, feedback).

If sufficient negative feedback is received, it can be desirable to ensure that the same internal question is not mapped again for the same incoming question. Likewise, if sufficient positive feedback is received, it can be desirable to ensure that the same internal question is mapped to the same incoming question. In order to achieve this result, the following approach can be used. First, historical feedback can be pre-processed by (i) normalizing the asked questions (e.g., converting multiple spaces to a single space, removing punctuation, making letters lowercase, etc.); (ii) assigning weight 1 to the question-question pairs with positive feedback; (iii) assigning weight −1 to the question-question pairs with negative feedback; and (iv) aggregating question-question pairs by summing up their weights. Second, when a new question arrives, (i) normalize the new question; (ii) check the question in the preprocessed feedback data (e.g., if a record with >positive_threshold is found, use the mapped question id and return the question-answer pair for this; if a record with <negative_threshold is found, search for new question-answer by filtering out the list of negative mapped question ids. The question-question feedback is also used to refresh the weights used for the question-question mapping algorithm. In a similar manner, the answer correctness feedback is used to provide an input to the answer mining algorithm and to reject wrong question-answer pairs from the system and keep good question-answer pairs in the system.

Figure 6:
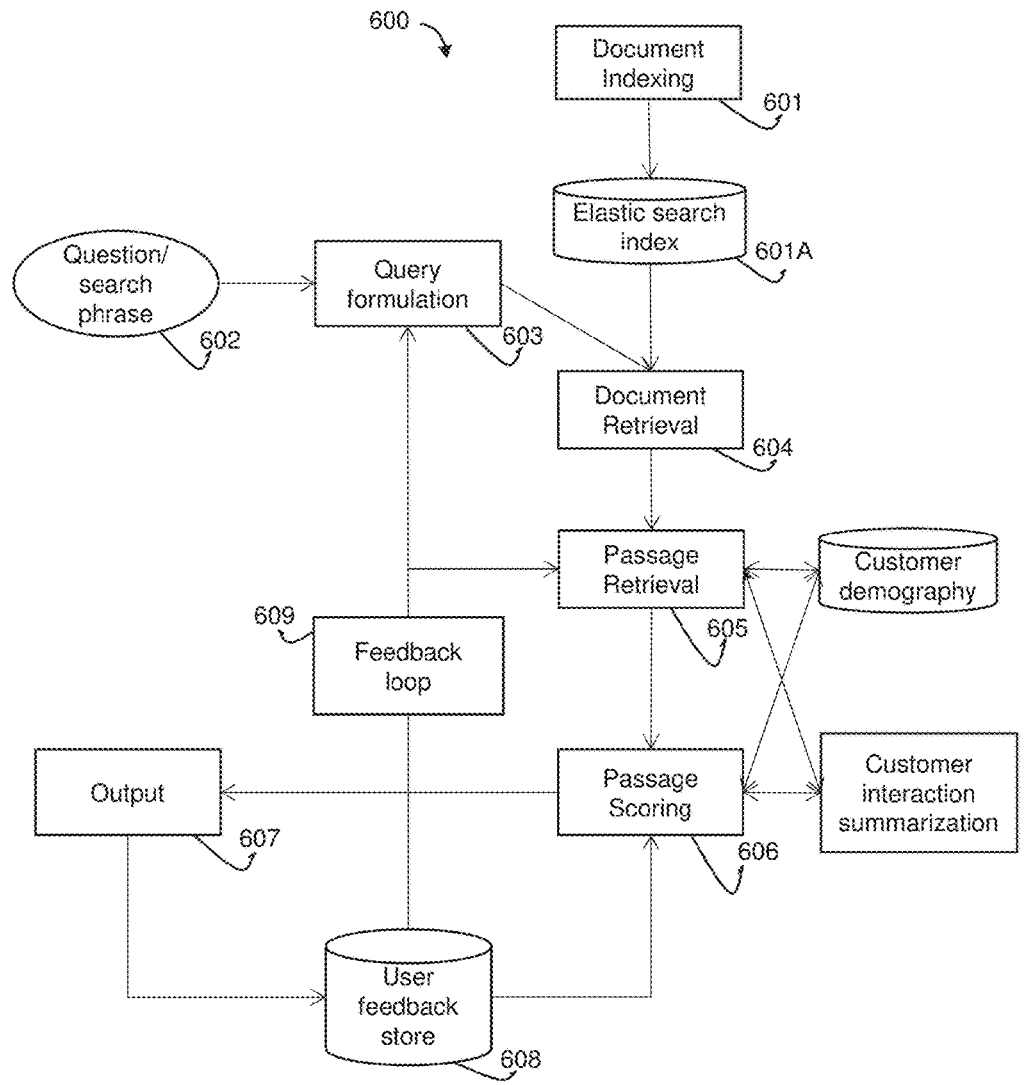
FIG. 6 is a flow diagram of a computerized method of using a document search module, according to an illustrative embodiment of the invention.

FIG. 6 is a flow diagram of a computerized method using a documents search module 600, according to an illustrative embodiment of the invention. These steps can also be performed by the query engine 120 shown and described above in FIG. 1. In a first step 601, a documents search index is created. The index can include the document title, topic hierarchy (if any), and document content in separate fields, and can be stored in an elastic search index 601A. Additional fields can include business unit and associate roles (sub units), and more fields can be added to improve context based search. In a second step represented by modules 602, 603, 604, documents are retrieved. The incoming search phrase is used to dynamically generate a query to search for documents using a certain list of features. One exemplary list includes the following features: a search phrase to match in title; a search phrase to match in title exact match; a search phrase to match in document body; a search phrase to match in a topic hierarchy; context features to match in a topic hierarchy; context features to match a title. The search phrase does not match each of the fields completely and is based on the degree of match (e.g., each of the features returns a value). The above query output is linearly combined with different weights given to each of the features. The resulting documents are ranked and returned in decreasing order of score as candidate documents.

In a third step represented by modules 605, 606, a sliding-window based approach is adopted to search for the right passage. A sliding window of 'n' sentences is taken and maximal keyword match along with the inter-keyword match distance and word order match are used as features. This process is followed by moving the sliding window ahead by one sentence. The above features are combined with different weights to arrive at a score. The highest scoring window sentences are taken as the passage for that document, and output 607 is generated.

In a fourth step represented by modules 608, 609, feedback data is collected, e.g., for search result click, result correctness, and result ranking. Feedback data is used to retrain weights for the query generation phase and improve the results. All searches can be based on tf-idf based similarity matching. In some embodiments, this logic can be extended to a vector based similarity approach incorporating semantic information into the vector representations.

Figure 7A:
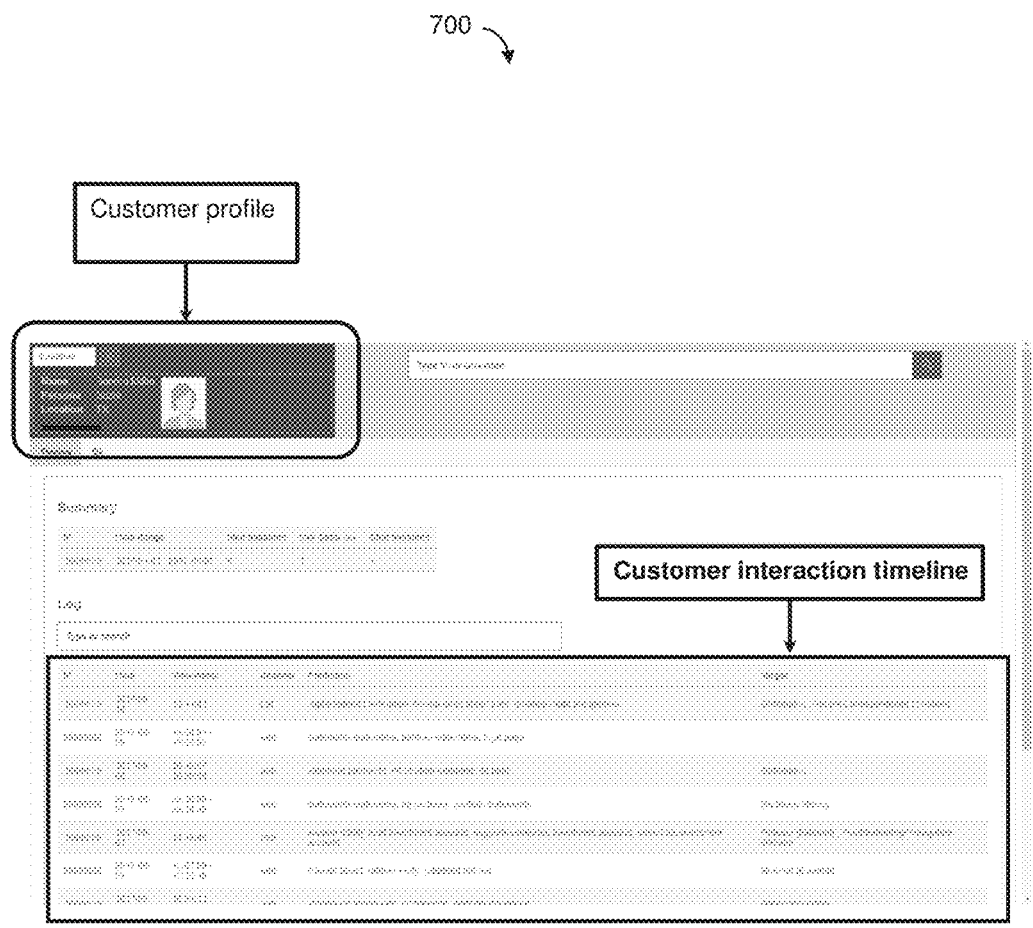
FIGS. 7A-7C show multiple illustrations of screenshots of a customer representative interface, according to an illustrative embodiment of the invention.
Figure 7B:
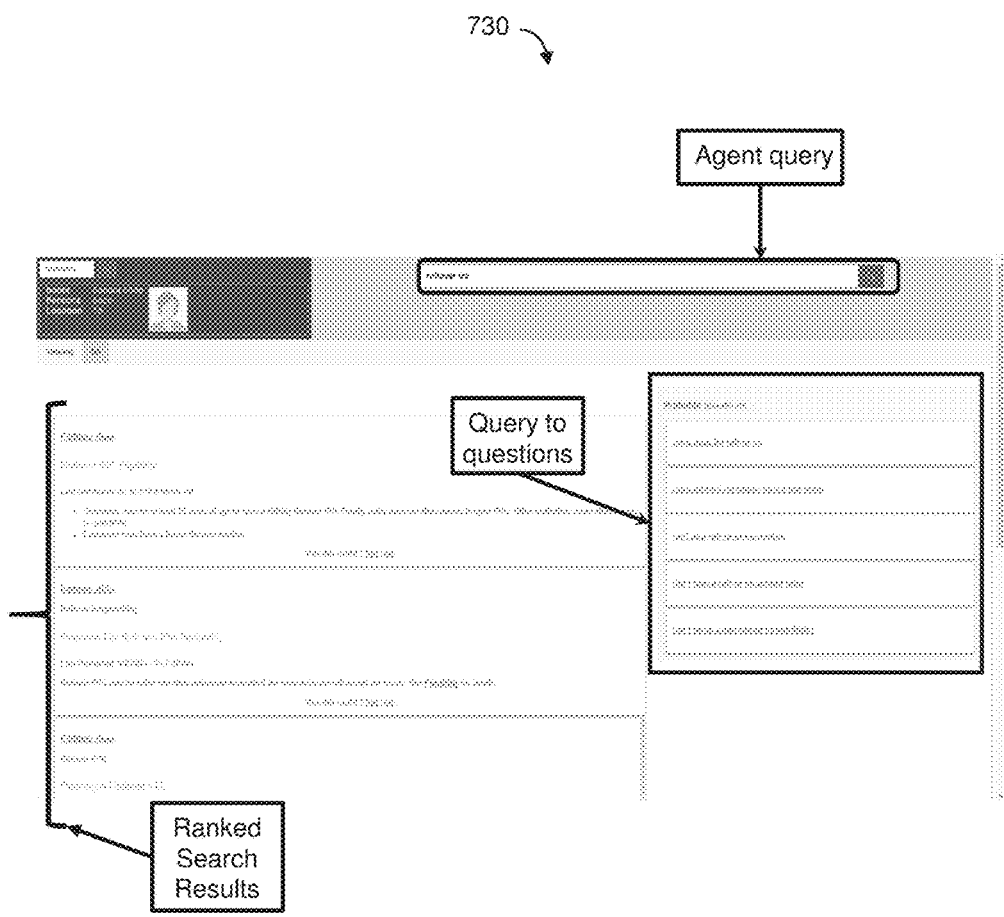
Figure 7C:
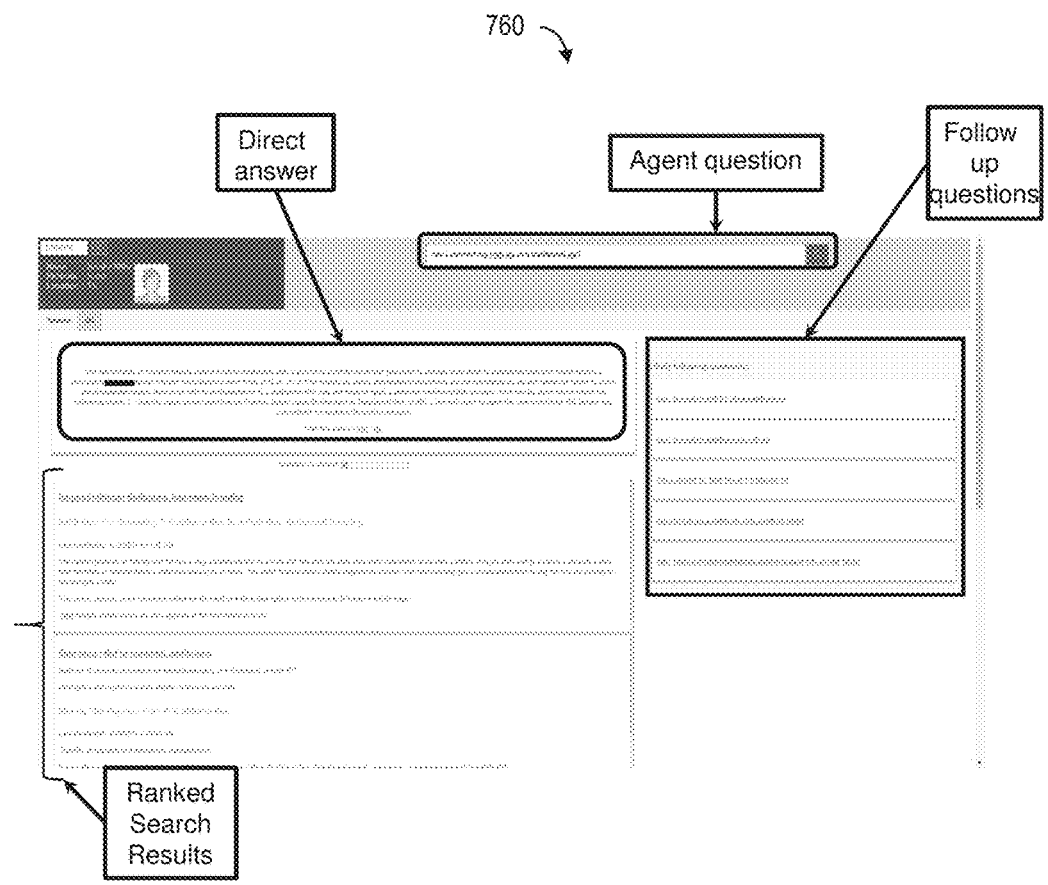

FIGS. 7A-7C show multiple illustrations of screenshots 700, 730, 760 of a customer representative interface, according to an illustrative embodiment of the invention. The screenshot 700 includes a customer profile (e.g., including name, persona, location), a summary (e.g., information on the type of relationship with the institution, type of accounts held etc.) and a text box for receiving an agent query. When set to the "timeline" tab, as in FIG. 7A, a log of customer interactions is visible, and is organized in the form of a customer interaction timeline showing sequential customer interactions. Each interaction can have a customer identifier, date, timestamp, channel, prediction of the issue raised, and target (e.g., topic for which the customer is calling, such as Password Reset, Rollover, etc.). The screenshot 730 shown in FIG. 7B shows another window having the profile and place for agent query (here the search query "rollover ira" has been entered), except here, the QA tab is selected instead of the timeline tab. In this view, ranked search results are shown on the left hand side, as well as probable questions shown on the right hand side. FIG. 7C shows a similar screen with the question "can I convert my roth ira to a traditional ira?" asked in the agent question field. In this view a direct answer is visible above the ranked search results. In addition, on the right hand side, instead of "probable questions", a box for "likely follow-up questions" is now visible.

The above-described techniques can be implemented in digital and/or analog electronic circuitry, or in computer hardware, firmware, software, or in combinations of them. The implementation can be as a computer program product, i.e., a computer program tangibly embodied in a machine-readable storage device, for execution by, or to control the operation of, a data processing apparatus, e.g., a programmable processor, a computer, and/or multiple computers. The computer program can be deployed in a cloud computing environment (e.g., Amazon® AWS, Microsoft® Azure, IBM®). Method steps can be performed by one or more processors executing a computer program to perform functions of the invention by operating on input data and/or generating output data.

To provide for interaction with a user, the above described techniques can be implemented on a computing device in communication with a display device, e.g., a plasma or LCD (liquid crystal display) monitor or a mobile computing device display or screen for displaying information to the user and a keyboard and a pointing device, e.g., a mouse, a touchpad, or a motion sensor, by which the user can provide input to the computer (e.g., interact with a user interface element). Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, and/or tactile input.

The above-described techniques can be implemented in a distributed computing system that includes a back-end component. The back-end component can, for example, be a data server, a middleware component, and/or an application server. The above described techniques can be implemented in a distributed computing system that includes a front-end component. The front-end component can, for example, be a client computer having a graphical user interface, a Web browser through which a user can interact with an example implementation, and/or other graphical user interfaces for a transmitting device. The above described techniques can be implemented in a distributed computing system that includes any combination of such back-end, middleware, or front-end components.

The components of the computing system can be interconnected by transmission medium, which can include any form or medium of digital or analog data communication (e.g., a communication network). Transmission medium can include one or more packet-based networks and/or one or more circuit-based networks in any configuration. Packet-based networks can include, for example, the Internet, a carrier internet protocol (IP) network (e.g., local area network (LAN), wide area network (WAN), campus area network (CAN), metropolitan area network (MAN), home area network (HAN)), a private IP network, an IP private branch exchange (IPBX), a wireless network (e.g., radio access network (RAN), Bluetooth, near field communications (NFC) network, Wi-Fi, WiMAX, general packet radio service (GPRS) network, HiperLAN), and/or other packet-based networks. Circuit-based networks can include, for example, the public switched telephone network (PSTN), a legacy private branch exchange (PBX), a wireless network (e.g., RAN, code-division multiple access (CDMA) network, time division multiple access (TDMA) network, global system for mobile communications (GSM) network), and/or other circuit-based networks.

Information transfer over transmission medium can be based on one or more communication protocols. Communication protocols can include, for example, Ethernet protocol, Internet Protocol (IP), Voice over IP (VOIP), a Peer-to-Peer (P2P) protocol, Hypertext Transfer Protocol (HTTP), Session Initiation Protocol (SIP), H.323, Media Gateway Control Protocol (MGCP), Signaling System #7 (SS7), a Global System for Mobile Communications (GSM) protocol, a Push-to-Talk (PTT) protocol, a PTT over Cellular (POC) protocol, Universal Mobile Telecommunications System (UMTS), 3GPP Long Term Evolution (LTE) and/or other communication protocols.

Devices of the computing system can include, for example, a computer, a computer with a browser device, a telephone, an IP phone, a mobile computing device (e.g., cellular phone, personal digital assistant (PDA) device, smart phone, tablet, laptop computer, electronic mail device), and/or other communication devices. The browser device includes, for example, a computer (e.g., desktop computer and/or laptop computer) with a World Wide Web browser (e.g., Chrome™ from Google, Inc., Microsoft® Internet Explorer® available from Microsoft Corporation, and/or Mozilla® Firefox available from Mozilla Corporation). Mobile computing device include, for example, a Blackberry® from Research in Motion, an iPhone® from Apple Corporation, and/or an Android™-based device. IP phones include, for example, a Cisco® Unified IP Phone 7985G and/or a Cisco® Unified Wireless Phone 7920 available from Cisco Systems, Inc.

It should also be understood that various aspects and embodiments of the technology can be combined in various ways. Based on the teachings of this specification, a person of ordinary skill in the art can readily determine how to combine these various embodiments. In addition, modifications may occur to those skilled in the art upon reading the specification.

What is claimed is:

1. A computerized method of representing customer interactions with an organization, the computerized method comprising:
   receiving, by a computing device, customer web interaction data segments and customer conversation data segments including at least one of chat data or phone call transcripts;
   pre-processing, by the computing device, the customer conversation data segments to remove specified types of information, thereby generating pre-processed customer conversation data segments, each data segment having a timestamp and a customer identifier;
   scoring, by the computing device, each of the pre-processed customer conversation data segments using a pre-trained transaction module;
   pre-processing, by the computing device, the customer web data interaction segments, thereby generating pre-processed customer web data interaction segments, each data segment having a timestamp and a customer identifier;
   extracting, by the computing device, from the pre-processed customer web interaction data segments, one or more tokens;
   combining, by the computing device, the pre-processed customer conversation data segments and the pre-processed customer web interaction data segments into a customer data set;
   parsing, by the computing device, the customer data set into one or more windows using the timestamps and the customer identifiers, each window including one or more tokens;
   assigning, by the computing device, for each window, pre-trained weights to each of the one or more tokens in each window;
   assigning, by the computing device, a transaction theme to each window based on the on one or more tokens in each window using an association model; and
   generating, by the computing device, based on the transaction themes, a ranked list of topic keywords reflecting the customer web interaction data segments and customer conversation data segments.

2. The method of claim 1 further including displaying, by the computing device, the ranked list of topic keywords in a user interface for a customer service representative.

3. The method of claim 1 further including storing, by the computing device, the ranked list of topic keywords in a database in electronic communication with the computing device.

4. The method of claim 1 wherein pre-processing the customer conversation data segments removes system metadata.

5. The method of claim 1 wherein extracting the one or more keywords from the pre-processed customer conversation data segments includes: (i) combining, by the computing device, customer interaction data from a single data session into one text file; (ii) applying, by the computing device, a sentence tokenization algorithm to parse the customer interaction data session into discrete sentence tokens; and (iii) identifying, by the computing device, key phrases using a stop phrase algorithm to identify, within the discrete sentence tokens, one or more phrases having specified characteristics.

6. The method of claim 1 wherein scoring each of the pre-processed customer interaction data segments includes: (i) tokenizing, by the computing device, each of the one or more pre-processed customer interaction data segments; (ii) converting, by the computing device, for each of the one or more pre-processed customer interaction data segments, the tokenized data into a feature-document matrix; (iii) calculating, by the computing device, a score for each pre-processed customer interaction data segment; (iv) determining, by the computing device, a highest score; and (v) assigning, by the computing device, a pre-processed customer interaction data segment having the highest score to the customer conversation data segment, provided that the highest score is above a certain threshold.

7. The method of claim 1 wherein combining the pre-processed customer interaction data segments into a single customer data set includes rolling up the one or more pre-processed customer data segments using customer identifiers and timestamps, thereby creating a chronologically sorted representation of customer interactions for each customer.

8. The method of claim 1 wherein pre-processing the customer web data interaction segments includes at least one of cleaning html encodings from page name tags, adding URL identifiers, or removing channel information.

9. The method of claim 1 wherein the one or more tokens extracted from the pre-processed customer web interaction data segments are at least one of unigram tokens or bigram tokens.

10. The method of claim 1 wherein a new window is created if a customer medium of interaction changes in time or a period of more than a pre-determined time threshold passes with no customer activity occurring.

11. The method of claim 1 wherein assigning pre-trained weights to each of the one or more tokens in each window includes calculating an inverse document frequency (IDF) value for all tokens.

12. The method of claim 1 wherein assigning a transaction theme to each window is based on selecting a top three tokens for each web window.

13. The method of claim 1 wherein generating the ranked list of topic keywords includes applying a formula using context keywords, channel weights, and interaction times as decay weights to score the topic keywords for each customer.

14. A computerized system including:
   a computing device including a context engine for representing customer interactions with an organization and a query engine for generating a question-answer set for use by a customer service representative of an organization and mining answers to questions, the computing device configured to:

receive customer web interaction data segments and customer conversation data segments including at least one of chat data or phone call transcripts;

pre-process the customer conversation data segments to remove specified types of information, thereby generating pre-processed customer conversation data segments, each data segment having a timestamp and a customer identifier;

score each of the pre-processed customer conversation data segments using a pre-trained transaction module;

pre-process the customer web data interaction segments, thereby generating pre-processed customer web data interaction segments, each data segment having a timestamp and a customer identifier;

extract, from the pre-processed customer web interaction data segments, one or more tokens;

combine the pre-processed customer conversation data segments and the pre-processed customer web interaction data segments into a customer data set;

parse the customer data set into one or more windows using the timestamps and the customer identifiers, each window including one or more tokens;

assign, for each window, pre-trained weights to each of the one or more tokens in each window;

assign a transaction theme to each window based on the on one or more tokens in each window using an association model; and generate, based on the transaction themes, a ranked list of topic keywords reflecting the customer web interaction data segments and customer conversation data segments;

one or more databases in electronic communication with the computing device, the one or more databases storing customer web interaction data and customer conversation data including at least one of chat data or phone call transcripts; and a virtual agent computing device in electronic communication with the computing device.

15. The system of claim 14 further including a chat VA archives database in electronic communication with the computing device; a historical questions database in electronic communication with the computing device; a search questions database in electronic communication with the computing device; a customer demography database in electronic communication with the computing device; and a user feedback store database in electronic communication with the computing device.

* * * * *

UNITED STATES PATENT AND TRADEMARK OFFICE
CERTIFICATE OF CORRECTION

PATENT NO. : 10,445,745 B1
APPLICATION NO. : 16/365309
DATED : October 15, 2019
INVENTOR(S) : Chopra et al.

Page 1 of 1

It is certified that error appears in the above-identified patent and that said Letters Patent is hereby corrected as shown below:

In the Claims

At Line 36 of Claim 1 (Column 17, Line 59), delete the second of two instances of the word "on".

Signed and Sealed this
Twenty-fourth Day of November, 2020

Andrei Iancu
*Director of the United States Patent and Trademark Office*